United States Patent
Törnkvist et al.

(10) Patent No.: US 10,477,364 B2
(45) Date of Patent: Nov. 12, 2019

(54) METHOD AND APPARATUS FOR CHARGING IN A TELECOMMUNICATION NETWORK

(71) Applicant: Telefonaktiebolaget LM Ericsson (publ), Stockholm (SE)

(72) Inventors: Robert Törnkvist, Karlskrona (SE); Jan Perman, Kalmar (SE); Lars Lindborg Olsson, Karlskrona (SE)

(73) Assignee: Telefonaktiegolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/309,714

(22) PCT Filed: Jun. 23, 2016

(86) PCT No.: PCT/SE2016/050616
§ 371 (c)(1),
(2) Date: Dec. 13, 2018

(87) PCT Pub. No.: WO2017/222434
PCT Pub. Date: Dec. 28, 2017

(65) Prior Publication Data
US 2019/0141493 A1   May 9, 2019

(51) Int. Cl.
*H04M 1/66* (2006.01)
*H04W 4/24* (2018.01)
(Continued)

(52) U.S. Cl.
CPC .............. *H04W 4/24* (2013.01); *H04L 12/14* (2013.01); *H04L 12/141* (2013.01);
(Continued)

(58) Field of Classification Search
CPC ...... H04L 12/14; H04L 12/141; H04M 15/00; H04M 15/785; H04M 15/85; H04M 15/854; H04M 15/82; H04M 15/66; H04W 4/24
(Continued)

(56) References Cited

U.S. PATENT DOCUMENTS

| | | | |
|---|---|---|---|
| 2005/0111423 A1* | 5/2005 | Anderson | H04W 72/0453 370/341 |
| 2011/0003579 A1* | 1/2011 | Cai | G06Q 20/14 455/408 |

(Continued)

FOREIGN PATENT DOCUMENTS

| | | |
|---|---|---|
| WO | 2012150885 A1 | 11/2012 |
| WO | 2014108801 A1 | 7/2014 |
| WO | 2015161361 A1 | 10/2015 |

OTHER PUBLICATIONS

Author Unknown, "Technical Specification Group Services and System Aspects; Telecommunication management; Charging management; Diameter charging applications (Release 13)," Technical Specification 32.299, Version 13.4.0, 3GPP Organizational Partners, Mar. 2016, 184 pages.

(Continued)

*Primary Examiner* — Danh C Le
(74) *Attorney, Agent, or Firm* — Withrow & Terranova, PLLC (57) ABSTRACT

According to one aspect of this disclosure, a charging client in a telecommunication network controls, or at least influences, the time over which a granted resource quota is considered valid for use in initiating or continuing a communication session that is subject to online charging control. When sending a given reservation request to a controlling charging server, the charging client indicates the requested timer value. Provided the requested timer value is acceptable (Continued)

to the charging server, the server sends a reservation response that includes a conforming granted timer value, and the charging client times expiration of the granted resource quota according to the granted timer value. In case the reservation response is non-conforming, the charging client decides whether or not to use the granted resource quota. Such operations allow the charging client to tune quota timer values, for example, in dependence on loading at the charging client.

30 Claims, 4 Drawing Sheets (51) Int. Cl.
*H04L 12/14* (2006.01)
*H04M 15/00* (2006.01)
(52) U.S. Cl.
CPC .......... *H04M 15/00* (2013.01); *H04M 15/62* (2013.01); *H04M 15/66* (2013.01); *H04M 15/785* (2013.01); *H04M 15/85* (2013.01); *H04M 15/853* (2013.01); *H04M 15/854* (2013.01)
(58) Field of Classification Search
USPC ........................................ 455/406, 405, 418
See application file for complete search history.

(56) References Cited

U.S. PATENT DOCUMENTS

| 2013/0086144 A1* | 4/2013 | Wu ...................... H04L 67/145 709/203 |
| 2014/0108212 A1* | 4/2014 | Cassel ............... H04M 15/8027 705/30 |
| 2015/0105045 A1 | 4/2015 | Rolfe et al. |
| 2015/0156334 A1* | 6/2015 | Chai .................... H04L 12/1467 455/406 |
| 2015/0188840 A1* | 7/2015 | Xiao ........................ G06F 9/50 709/226 |
| 2016/0255159 A1* | 9/2016 | Beasley .................. G06F 11/00 709/226 |
| 2016/0294569 A1* | 10/2016 | Chen ....................... H04W 4/24 |
| 2017/0223193 A1* | 8/2017 | Chai .................... H04L 41/0893 |
| 2018/0270328 A1* | 9/2018 | Agarwal ................. H04L 67/16 |

OTHER PUBLICATIONS

International Search Report and Written Opinion for International Patent Application No. PCT/SE2016/050616, dated Feb. 13, 2017, 10 pages.

* cited by examiner

METHOD AND APPARATUS FOR CHARGING IN A TELECOMMUNICATION NETWORK

This application is a 35 U.S.C. § 371 national phase filing of International Application No. PCT/SE2016/050616, filed Jun. 23, 2016, the disclosure of which is incorporated herein by reference in its entirety.

TECHNICAL FIELD

The present invention relates to telecommunication networks, and particularly relates to the operation of charging clients and servers in such networks.

BACKGROUND

Telecommunication networks critically depend on charging operations, for technical and economic reasons. Online charging conditions the usage or "consumption" of a communication service by a particular user, based on making corresponding "reservations" against a subscriber account to be charged for the usage. Initiating or continuing a communication session in the context of online charging, therefore, involves a series accounting messages flowing between a charging client associated with control of the session and a charging server associated with assessing charges against the subscriber account.

In an example scenario, a request for web or other data access causes a Charging Trigger Function (CTF) to communicate with an Online Charging Function (OCF). Here, the CTF operates as the charging client and it sends a reservation request to the OCF operating as the charging server. When granting a reservation request for particular user, the OCF makes a reservation against the associated subscriber account, meaning that all or a portion of the credit balance in the subscriber account is reserved for consumption of the resource quota granted for consumption by the user. Resource quotas may be expressed in terms of the underlying communication resource, e.g., in bytes of data, minutes of connectivity, etc., and a rating function may be used to translate the quota units into a monetary value, to be "locked" or reserved in the subscriber account.

Further reservations support continuation of the communication session beyond the extent permitted by the initial quota reservation, and termination of the communication session triggers reconciliation of the consumption data, release of any reserved units or funds, etc. Extensive example details in the context of DIAMETER-based charging appear in the Third Generation Partnership Project (3GPP) technical specification that is entitled "Telecommunication management; Charging management; Diameter charging applications," and identified as TS 32.299.

Charging operations involve significant signaling going between the charging clients and the supporting charging server(s), and impose potentially significant processing burdens on the respective nodes, in terms of computational and working storage requirements. Competing interests and established protocols complicate the optimization of charging operations with respect to the signaling overhead and processing burden.

For example, making a quota reservation against a subscriber account ties up at least a portion of the funds available in the subscriber account, which may result in the account being considered deficient with respect to authorizing other services during the time that the quota reservation is considered valid. These account "impairments" militate against making overly aggressive quota reservations. Here, larger or longer lived quota reservations are considered more aggressive than smaller or shorter lived quota reservations.

On the other hand, more aggressive quota reservations tend to reduce signaling overhead, because new or refreshed reservations are needed less frequently with respect to the involved communication sessions. Conversely, when quota reservations are less aggressive, new reservations generally need to be made more frequently, because less aggress reservations have shorter timer values and/or provide for less consumption than would a more aggressive reservation. Advantageously, however, using shorter, less aggressive timer values tends to reduce the overall number of active reservations that need to be supported at the involved nodes.

Recognized herein is the fact that "standard" approaches to reserving quota does not accommodate the fact that operating conditions at the requesting client may diverge from conditions at the supporting server. Thus, such as seen in TS 32.299, having the server control the resource reservation parameters denies charging clients the opportunity to "tune" requested reservations to their operating conditions.

SUMMARY

According to one aspect of this disclosure, a charging client in a telecommunication network controls, or at least influences, the time over which a granted resource quota is considered valid for use in initiating or continuing a communication session that is subject to online charging control. When sending a given reservation request to a controlling charging server, the charging client indicates a timer value as a requested timer value. Provided the timer value is acceptable to the charging server, the server sends a reservation response that includes a conforming granted timer value, and the charging client times expiration of the granted resource quota according to the granted timer value. In case the reservation response is non-conforming, the charging client decides whether or not to use the granted resource quota. Such operations allow the charging client to tune timer values associated with the quota, for example, in dependence on loading at the charging client.

An example embodiment involves a method performed by a node in a telecommunication network, where the node is operative as a charging client. The method includes receiving a request for resource usage, requesting usage of a communication resource of the telecommunication network by a user of the telecommunication network. Further, the method includes determining a timer value, the timer value being a time for which a reservation against usage of the communication resource should remain valid against a subscriber account associated with the user. Further operations in the method include the charging client sending a reservation request to another node in the telecommunication network that is operative as a charging server, the reservation request indicating the timer value as a requested timer value, and receiving a reservation response in return from the charging server. The reservation response indicates a quota reservation and a granted timer value for the quota reservation. In response to determining at least that the granted timer value conforms to the timer value, the charging client initiates or continues a communication session for the user, based on a granted resource quota represented by the quota reservation. Such operations include tracking consumption of the granted resource quota during the session and timing expiration of the quota reservation according to the granted timer value.

In a corresponding example embodiment, a node configured for operation as a charging client in a telecommunication network includes communication interface circuitry and associated processing circuitry. The communication interface circuitry is configured to send and receive signaling to one or more other nodes or devices operating in the telecommunication network. The processing circuitry is configured to receive a request for resource usage, requesting usage of a communication resource of the telecommunication network by a user of the telecommunication network. The processing circuitry is further configured to determine a timer value, the timer value being a time for which a reservation against usage of the communication resource should remain valid against a subscriber account associated with the user, and send a reservation request to another node in the telecommunication network that is operative as a charging server.

The reservation request indicates the timer value as a requested timer value, and the processing circuitry is configured to receive a reservation response in return from the charging server, the reservation response indicating a quota reservation and a granted timer value. Responsive to determining at least that the granted timer value indicated in the reservation response conforms to the timer value requested, the processing circuitry is configured to initiate or continue a communication session for the user. The initiation or continuation of the session is based on a granted resource quota represented by the quota reservation, and the processing circuitry tracks consumption of the communication resource during the session, against the quota reservation, and times expiration of the quota reservation according to the granted timer value.

In a complementary embodiment, a method is performed by a node in a telecommunication network, the node being operative as a charging server. The method includes receiving a reservation request from another node in the telecommunication network that is operative as a charging client. The reservation request indicates a requested timer value and requests usage of a communication resource by a user of the telecommunication network. The requested timer value represents the time for which a reservation against usage of the communication resource should remain valid against a subscriber account associated with the user, and the method includes determining whether or not a conforming reservation is possible.

The determination is based on determining whether the requested timer value is acceptable to the charging server and whether the subscriber account has available funds sufficient to cover a resource quota to be reserved against the subscriber account as a granted resource quota. In response to determining that a conforming reservation is possible, the method includes sending a reservation response to the charging client. The reservation response indicates the granted resource quota as a resource reservation and indicates a granted timer value in conformance with the requested timer value.

In a related embodiment, a node is configured for operation as a charging server in a telecommunication network and includes communication interface circuitry and associated processing circuitry. The communication interface circuitry is configured to communicatively couple the node to another node that is operative as a charging client in the telecommunication network. The processing circuitry is configured to receive a reservation request from the charging client, the reservation request indicating a requested timer value and requesting usage of a communication resource by a user of the telecommunication network. The requested timer value is the time for which a reservation against usage of the communication resource should remain valid against a subscriber account associated with the user.

Correspondingly, the processing circuitry is configured to determine whether or not a conforming reservation is possible. The determination is based on determining whether the requested timer value is acceptable to the charging server and whether the subscriber account has available funds sufficient to cover a resource quota to be reserved against the subscriber account as a granted resource quota. In response to determining that a conforming reservation is possible, the processing circuitry is configured to send a reservation response to the charging client, indicating the granted resource quota as a resource reservation and indicating a granted timer value in conformance with the timer value.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
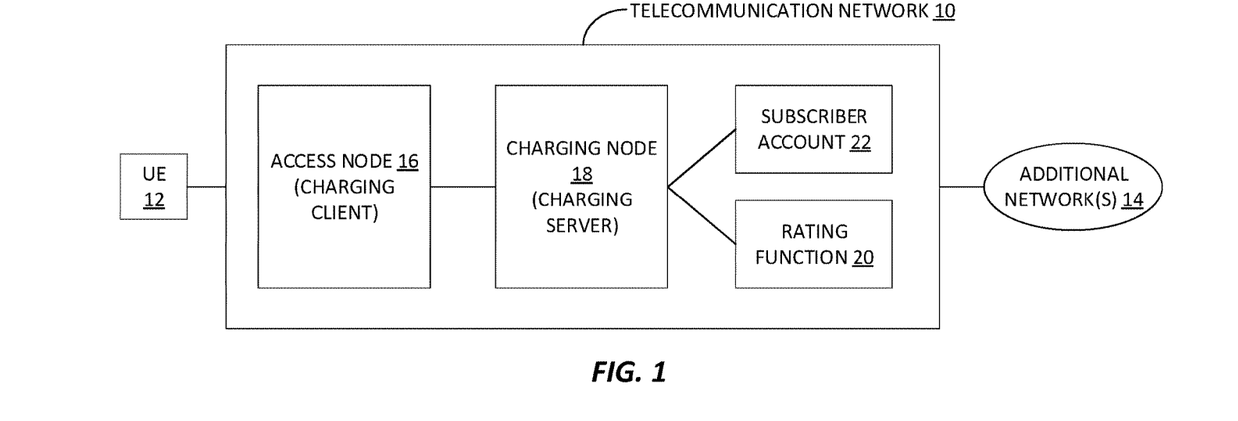
FIG. 1 is a simplified block diagram of one embodiment of a telecommunication network, including an access node operative as a charging client, and a charging node operative as a charging server.

FIG. 1 illustrates a telecommunication network 10 that is configured to communicatively couple a User Equipment (UE) 12 to one or more additional networks 14, such as the Internet. While one UE 12 appears in the illustration, the telecommunication network 10—hereafter, "network 10"—provides communication services to a potentially large number of UEs 12, and may include additional nodes to support overall network operations.

For ease of discussion, FIG. 1 illustrates the network 10 in simplified fashion, where the network 10 includes an access node 16 and a charging node 18. The charging node 18 is associated with a rating function 20 and a subscriber account 22, and the subscriber account 22 may be one among a large plurality of subscriber accounts in one or more databases maintained by the network 10.

The network 10 provides one or more communication services that are subject to online charging, and the access node 16 operates as a "charging client" for online charging operations. Correspondingly, the charging node 18 operates a controlling or supporting "charging server" in support of such operations. Communication service examples include voice services, data services, e.g., such as email, web browsing, media streaming, etc.

Figure 2:
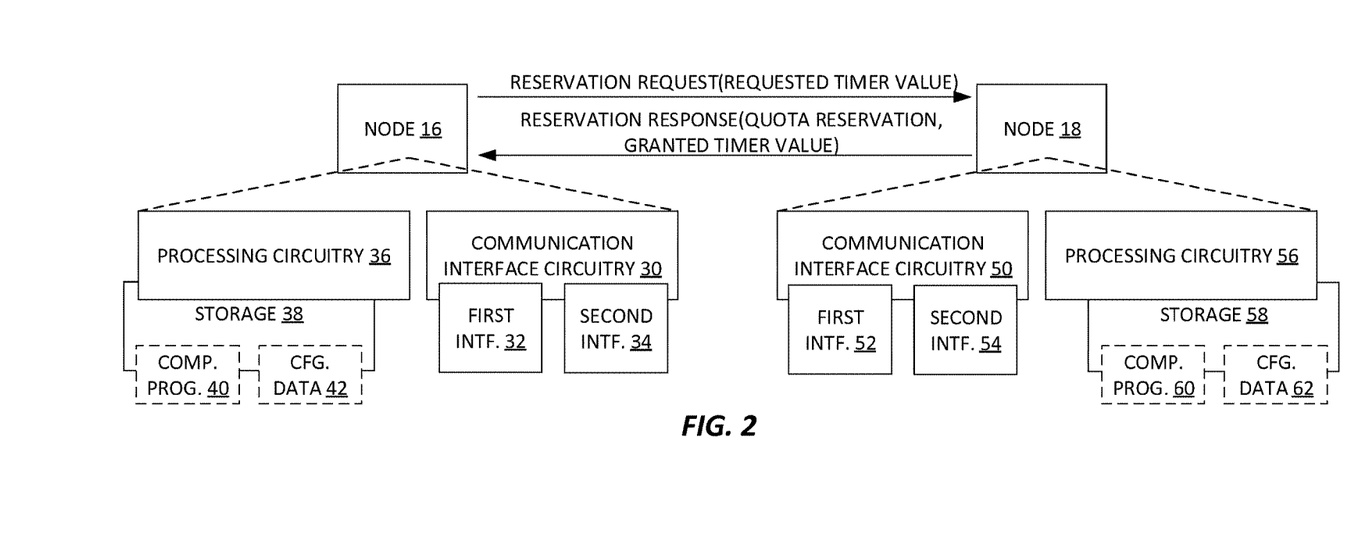
FIG. 2 is a block diagram of example embodiments of the access and the charging nodes introduced in FIG. 1.

FIG. 2 illustrates example implementations for the nodes 16 and 18, for operation in their respective roles as a charging client and a charging server. The node 16 comprises communication interface circuitry 30, which may include multiple interfaces, such as first and second interfaces 32 and 34, and further includes processing circuitry 36 that is operatively associated with the communication interface circuitry 30. The processing circuitry 36 includes or is associated with storage 38, which comprises one or more types of memory in at least one embodiment. In at least some embodiments, the storage 38 stores one or more computer programs 40, and may store certain configuration data 42 used during operation of the node 16.

Similarly, the node 18 comprises communication interface circuitry 50, which may include multiple interfaces, such as first and second interfaces 52 and 54, and further includes processing circuitry 56 that is operatively associated with the communication interface circuitry 50. The processing circuitry 56 includes or is associated with storage 58. In at least some embodiments, the storage 58 stores one or more computer programs 60, and may store certain configuration data 62 used during operation of the node 18.

As noted, in one or more embodiments, the node 16 is configured for operation as a charging client in the network 10, e.g., it implements a Charging Trigger Function (CTF) that exchanges accounting messages with the node 18, for securing quota reservations for usage of a communication service that is subject to online charging. The communication interface circuitry 30 is configured to send and receive signaling to one or more other nodes or devices operating in the network 10, such as the node 18.

The processing circuitry 36 is operatively associated with the communication interface circuitry 30 and is configured to receive a request for resource usage, requesting usage of a communication resource of the network 10 by a user of the network 10. Here, the term "user" shall be understood as referring to any device or system that uses the communication service, with the user device 12 being a prime example. For that reason, unless there is need to distinguish the user device 12 from its owner, the term "user 12" will be used for the remainder of this disclosure.

The processing circuitry 36 is further configured to determine a timer value, the timer value being a time for which a reservation against usage of the communication resource should remain valid against a subscriber account 22 associated with the user 12. Still further, the processing circuitry 36 is configured to send a reservation request to another node in the network 10 that is operative as a charging server, i.e., the node 18. The reservation request indicates the timer value as a requested timer value, and the processing circuitry 36 is configured to receive a reservation response in return from the charging server, the reservation response indicating a quota reservation and a granted timer value.

In response to determining at least that the granted timer value indicated in the reservation response conforms to the requested timer value, the processing circuitry 36 is configured to initiate or continue a communication session for the user 12, based on a granted resource quota represented by the quota reservation. Such operations include the processing circuitry 36 tracking consumption of the communication resource during the session, against the quota reservation, and timing expiration of the quota reservation according to the granted timer value.

In at least one embodiment, the processing circuitry 36 is configured to determine the timer value in dependence on loading at the charging client. For example, loading is measured in terms of ongoing signaling activity at the charging client, and the processing circuitry 36 is configured to choose a longer timer value than would otherwise be chosen, in response to determining that the level of signaling activity at the charging client meets or exceeds a defined signaling activity threshold.

In another example, the loading is measured in terms of memory utilization at the charging client. The processing circuitry 36 is configured to choose a shorter timer value than would otherwise be chosen, in response to determining that memory utilization at the charging client exceeds a defined utilization threshold. The memory utilization reflects the utilization of storage 38 at the charging client, for managing quota reservations for multiple users 12 being supported by the charging client.

In general, the phrase "loading at the charging client" may be understood as referring to one or more types of loading at the network node that implements the involved charging client. For this example, the node 16 implements the charging client. It shall also be understood that particular types of communication services may be associated with baseline or default timer value(s) to use when requesting quota reservations. In such cases, the timer value may be a value above or below the default timer value, in dependence on whether the loading is above a defined upper threshold or below a defined lower threshold. The default value may be used when the loading level lies between the upper and lower thresholds.

Alternatively, the timer value may be a value that is scaled in proportion to the level of loading, or may be a particular discrete value from among a plurality of defined values may be selected in dependence on the loading level. Other schemes are contemplated, but it should be appreciated that the charging client determines the timer value to request for a quota reservation in dependence on operating conditions at the charging client. Such operations thereby allow the charging client to tailor the duration of quota reservations managed by it, to conditions prevailing at the charging client.

In one or more embodiments, the charging client is configured for operation as a DIAMETER-based charging client in the network 10. In the same or other embodiments, the processing circuitry 36 is configured to indicate the timer value as a ranged value, and to determine that the granted timer value conforms with the requested timer value by determining that the granted timer value falls within the ranged value. Similarly, the processing circuitry 36 may be configured to determine that the granted timer value conforms with the requested timer value by determining that the granted timer value is within a defined range that includes the requested timer value.

Because the charging server is not obligated to grant the timer value requested by the charging client, the reservation response returned by the charging server will not necessarily conform to the reservation request. In response to determining that the granted timer value indicated in the reservation response does not conform to the timer value indicated in the reservation request, the processing circuitry 36 is configured to performing non-conforming response handling.

The non-conforming response handling includes deciding whether or not to use the granted quota for initiating or continuing the communication session for the user 12 in dependence one or more conditions. In at least one embodiment, the decision is based on at least one of: whether or not the loading at the charging client is above a defined threshold; whether or not the granted timer value deviates from the requested timer value by more than a defined amount; and whether or not one or more granted timer values that were previously received from the charging server and still valid were non-conforming with respect to the correspondingly requested timer values.

In at least some embodiments, the processing circuitry 36 is further configured to perform at least one of: determine a resource quota representing an amount or quantity of the communication resource to request for reservation to the user 12; or defer determination of the resource quota to the charging server by indicating an empty or null quota request in the reservation request. In the former case, the determined resource quota in indicated in the reservation request as a requested resource quota. As with the timer value requested by the charging client, the charging server need not necessarily grant a resource quota that conforms to the resource quota requested by the charging client, but generally will make a conforming grant to the extent that operating conditions allow.

Further, in at least one embodiment, the processing circuitry 36 is configured to determine a quota holding time for which the quota reservation will be maintained at the charging client in the absence of corresponding traffic. The charging client controls release of the quota reservation by the charging client in dependence on determining whether a cessation of usage of the communication resource with respect to the granted resource quota exceeds the quota holding time.

In the same or other embodiments, the processing circuitry 36 is configured to determine and request a quota consumption time. The quota consumption time defines the maximum pause in consumption that is chargeable. That is, usage of the communication resource may include pauses, and pauses shorter than that defined by the quota consumption time are counted against consumption.

Figure 3:
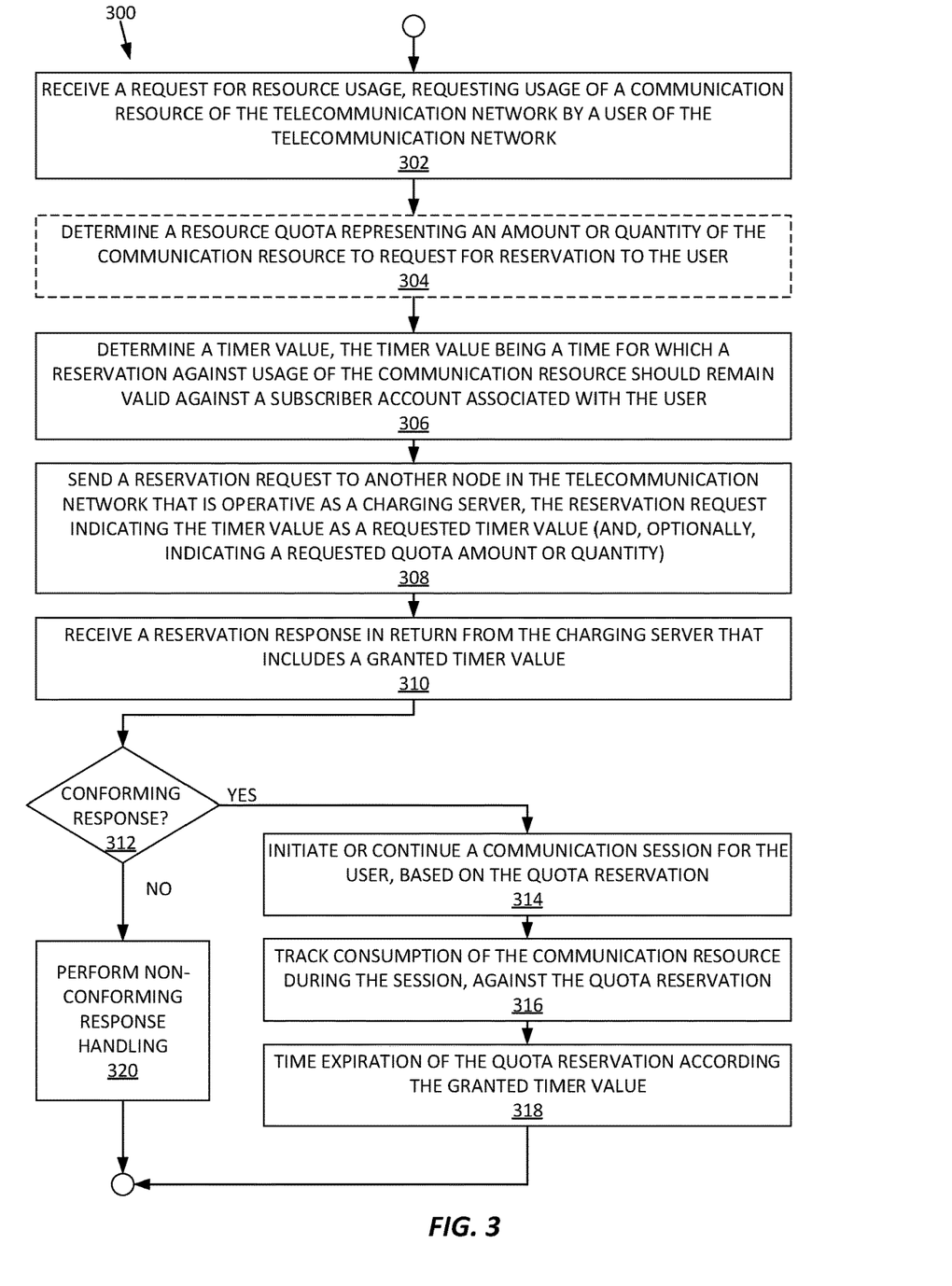
FIG. 3 is a logic flow diagram of one embodiment of a method performed by a node configured as a charging client.

FIG. 3 illustrates an example method 300 implemented by a node in the network 10 that is operative as a charging client, e.g., as implemented by the node 16. The method 300 includes receiving (Block 302) a request for resource usage, requesting usage of a communication resource of the network 10 by a user 12 of the network 10. In at least one embodiment, the method also includes determining a resource quota representing an amount or quantity of the communication resource to request for reservation to the user. This optional operation can be understood as the charging client controlling the quota size or amount to be requested, and thus represents another parameter of the reservation that it can control or influence as a function of prevailing operating conditions.

For example, the charging client may request larger or greater quotas than it otherwise would, when its signaling load is high, in an attempt to reduce the amount of subsequent signaling needed with respect to the communication session(s) in question. As an example, for a given communication service and/or for given subscriber agreements, there may be a "default" or "normal" quota size or amount, and the charging client may increase or decrease the default in dependence on loading. The quota sizes or amounts are increased, for example, in an attempt to reduce signaling overhead at the charging client, or the quota sizes or amounts are decreased, in an attempt to reduce memory utilization at the charging client.

The method 300 further includes determining (Block 306) a timer value, the timer value being the time for which a reservation against usage of the communication resource should remain valid against a subscriber account 22 associated with the user 12. Still further, the method 300 includes sending (Block 308) a reservation request to another node in the telecommunication network 10 that is operative as a charging server. The reservation request indicates the timer value as a requested timer value, and the method 300 includes receiving (Block 310) a reservation response in return from the charging server. The reservation response indicates a quota reservation and a granted timer value for the quota reservation.

In response to the charging client determining at least that the granted timer value conforms to the requested timer value (Block 312), the method 300 includes initiating or continuing (Block 314) a communication session for the user, based on a granted resource quota represented by the quota reservation. Such processing includes tracking (Block 316) consumption of the granted resource quota during the session, and timing (Block 318) expiration of the quota reservation according to the granted timer value.

Figure 4:
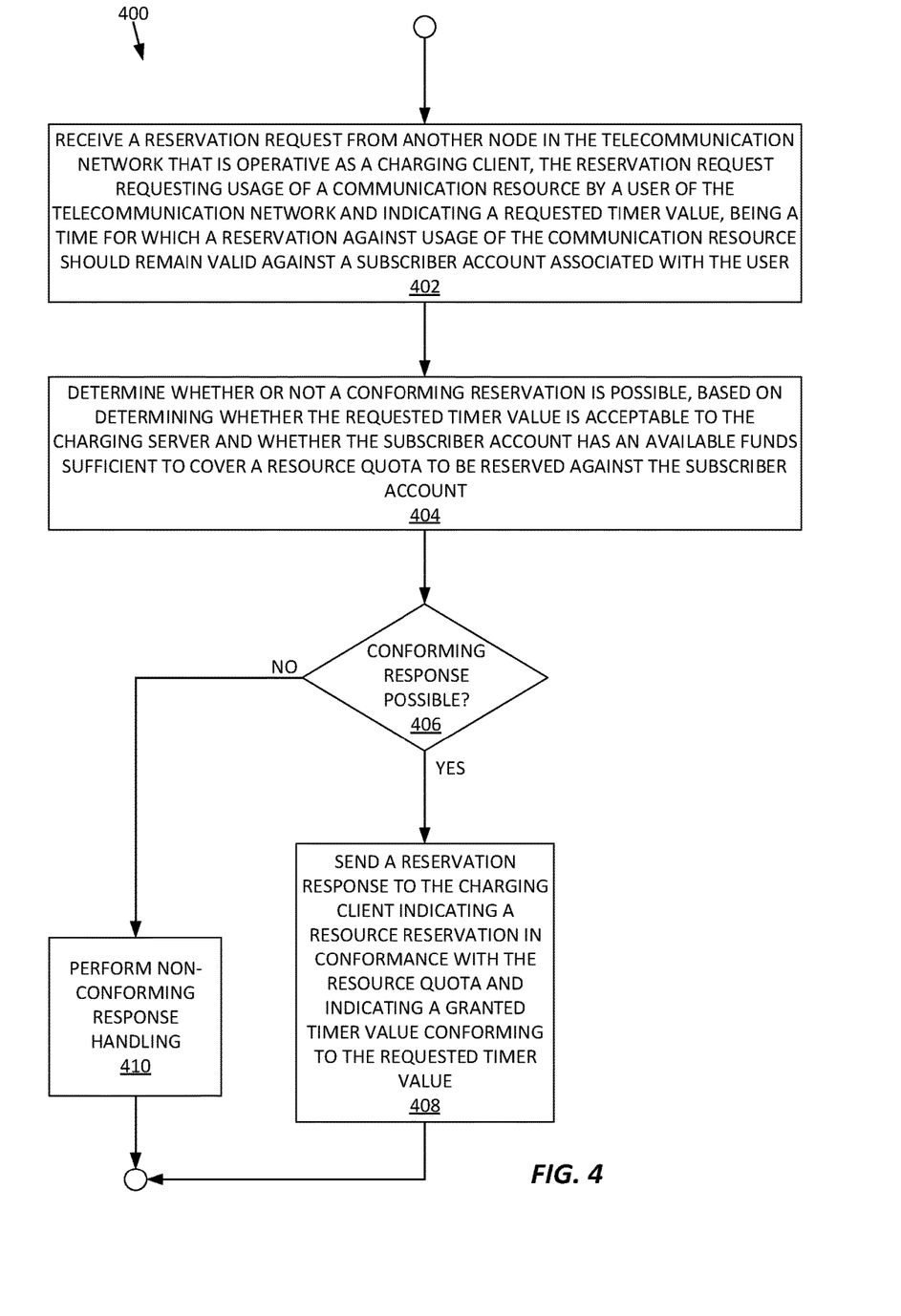
FIG. 4 is a logic flow diagram of one embodiment of a method performed by a node configured as a charging server.

FIG. 4 illustrates a complementary method 400, as performed by the node 18 or another node operating as a charging server with respect to the above-described charging client. The method 400 includes receiving (Block 402) a reservation request from another node in the network 10 that is operative as a charging client, such as the node 16.

The reservation request indicates a requested timer value and requests usage of a communication resource by a user 12 of the network 10. The requested timer value is a requested time for which a reservation against usage of the communication resource should remain valid against a subscriber account 22 associated with the user 12, and the method 400 includes determining (Block 404) whether or not a conforming reservation is possible.

The determination includes the charging server determining whether the requested timer value is acceptable to the charging server and whether the subscriber account 22 has available funds sufficient to cover a resource quota to be reserved against the subscriber account 22 as a granted resource quota. Whether or not the requested timer value is acceptable is determined, for example, based on loading or other operating conditions at the server. Additionally, or alternatively, the charging server may have a baseline set of protocols or rules that dictate whether a particular requested timer value is deemed acceptable.

In response to determining that a conforming reservation is possible (Block 406), the method 400 includes sending (Block 408) a reservation response to the charging client indicating the granted resource quota as a resource reservation and indicating a granted timer value in conformance with the requested timer value. Here, a conforming reservation is "possible" in the sense that granting a conforming reservation can be done without violating any rules and/or can be done without exceeding any operational limits configured at the charging server.

Additionally, the charging server may determine whether or not the requested timer value is acceptable, based on reservation rules governing fund reservations made by the charging server against the subscriber account 22. In general, the state or status of the involved subscriber account may be a determining factor as to whether a conforming reservation can be made.

In at least some embodiments, the reservation response returned to the charging client by the charging server indicates the granted timer value as timer value that matches the requested timer value or at least falls within a defined range of the requested timer value. In at least some embodiments, the granted timer value will be considered as conforming to the requested timer value if its value falls anywhere within a defined range of the requested timer value, i.e., matches it within some allowable tolerance. In general, the requested timer value may be a single value, or an indicated range or interval. Likewise, the granted timer value may be a single value, or an indicated range or interval.

In response to determining that a conforming reservation is not possible, based on the requested timer value being unacceptable to the charging server, the method includes sending a non-conforming reservation response that includes a granted timer value that is acceptable to the charging server. Correspondingly, the charging client can decide whether the granted timer value is acceptable to it, despite not conforming to the requested timer value.

With respect to the node 18 being operative as the above-described charging server, the communication interface circuitry 50 is configured to communicatively couple the node 18 to another node that is operative as a charging client in the network 10, such as the node 16. The processing circuitry 56 is operatively associated with the communication interface circuitry 50 and configured to receive a reservation request from the charging client.

The reservation request indicates a requested timer value and requests usage of a communication resource by a user 12 of the network 10, the requested timer value being a time for which a reservation against usage of the communication resource should remain valid against a subscriber account 22 associated with the user 12. The processing circuitry 56 is configured to determine whether or not a conforming reservation is possible, based on determining whether the requested timer value is acceptable to the charging server and whether the subscriber account 22 has available funds sufficient to cover a resource quota to be reserved against the subscriber account 22 as a granted resource quota. In response to determining that a conforming reservation is possible, the processing circuitry 56 is configured to send a reservation response to the charging client indicating the granted resource quota as a resource reservation and indicating a granted timer value in conformance with the requested timer value.

Figure 5:
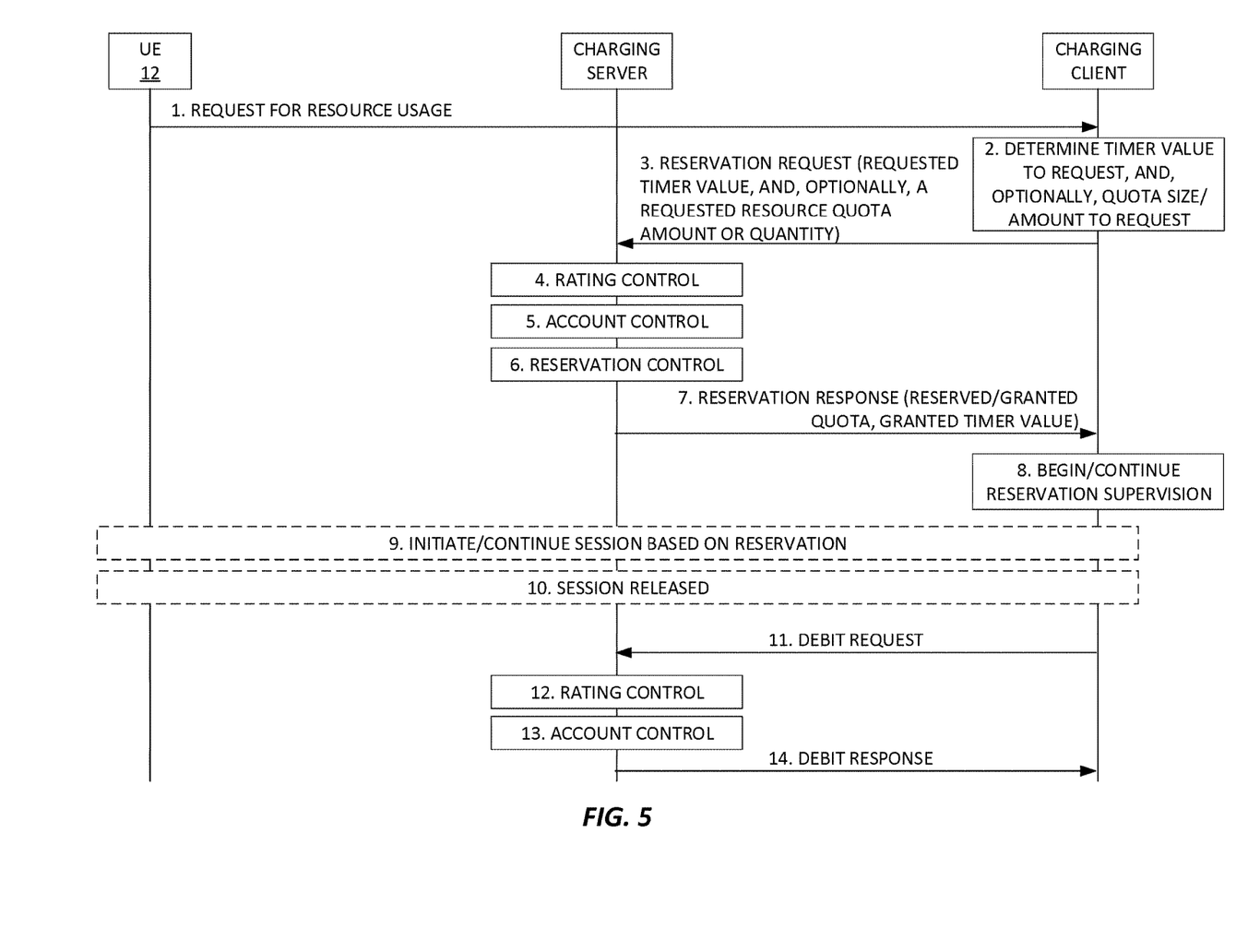
FIG. 5 is a signaling diagram of one embodiment of signaling associated with charging in a telecommunication network.

FIG. 5 illustrates an example signal flow, involving a UE 12, a charging client, and a charging server. At Item 1, the UE 12 requests session establishment from the charging client, operating as a CTF in the network 10. Item 2 involves "unit determination" by the charging client, wherein the charging client generates a reservation request, which includes determination of the timer value to request for the reservation and, optionally, determination of the resource quota to request. Here, the resource quota may be represented in whatever "units" are used to meter or measure the underlying communication service, e.g., minutes, bytes, etc.

In Item 3, the charging client sends the reservation request to the charging server, operating as an Online Charging Function (OCF) in the network 10. The charging function performs rating control, account control, and reservation control, in Items 4, 5, and 6. For rating control, a rating function 20 assists the charging server in determining a price for the number of units to be reserved against the involved subscriber account 22. For account control, the charging server checks whether the subscriber account balance is sufficient for the contemplated reservation. For reservation control, assuming a sufficient balance is available, the charging server makes the reservation against the subscriber account 22, which "locks" a portion of the available funds for securing the quota. The granted resource quota specifies the number of units of the communication resource that have been reserved for consumption by the UE 12, and the granted timer value specifies the period during which the reservation is valid. For example, for data consumption, the reservation may be valid for one hour, one day, etc.

Assuming that the reservation response conforms with the timer value included in the reservation request, or is otherwise acceptable to the charging client, the charging client in Item 8 begins or continues reservation supervision and, in Item 9, initiates or continues a communication session for the UE 12, based on the reservation.

At some point, denoted as Item 10 in the diagram, the session is released, and the charging client sends a debit request to the charging server, to ensure the deduction of an amount corresponding to the consumed number of units from the subscriber's account. Such deduction is, of course, based on the charging client tracking consumption of the quota during the session, including accounting for any additional quota requests needed to continue the session. The charging server performs rating control given the overall consumption, makes or initiates a corresponding account deduction, and returns a debit response to the charging client that indicates the deducted units.

With the example embodiments above in mind, the telecommunication network 10 comprises, for example, a Long Term Evolution (LTE) network, and the charging client and server implement the DIAMETER protocol.

The Credit Control Request (CCR) message format is defined according to 3GPP TS 32.299 as follows:

```
<CCR> ::= < Diameter Header: 272, REQ, PXY >
    < Session-Id >
    { Origin-Host }
    { Origin-Realm }
    { Destination-Realm }
    { Auth-Application-Id }
    { Service-Context-Id }
    { CC-Request-Type }
    { CC-Request-Number }
    ...
    [ Event-Timestamp ]
    *[ Subscription-Id ]
    ...
    [ Requested-Action ]
    ...
    [ Multiple-Services-Indicator ]
    *[ Multiple-Services-Credit-Control ]
    ...
```

Where the Multiple-Services-Credit-Control AVP has the following ABNF grammar:

```
<Multiple-Services-Credit-Control> ::=    < AVP Header: 456 >
    ...
    [ Requested-Service-Unit ]
    * [ Used-Service-Unit ]
    ...
    [ Rating-Group ]
    ...
    [ Validity-Time ]
    [ Requested-Validity-Time ]
    ...
    [ Final-Unit-Indication ]
    [ Time-Quota-Threshold ]
    [ Volume-Quota-Threshold ]
    [ Unit-Quota-Threshold ]
    [ Quota-Holding-Time ]
    [ Requested-Quota-Holding-Time ]
    [ Quota-Consumption-Time ]
    [ Requested-Quota-Consumption-Time ]
    ...
    [ Time-Quota-Mechanism ]
    ...
```

In the above listing, the italicized entries represent new items to be accommodated in the protocol, for enabling the charging client to indicate the timer value, or range of values, that it would prefer using for any one or more of the quota validity timer, the quota holding timer, and the quota consumption timer.

Where the Requested-Validity-Time AVP would have the following ABNF grammar and define the timer value of the granted quota:

```
<Requested-Validity-Time> ::=
    [ Min-Time ]
    [ Max-Time ]
```

Where the Requested-Quota-Consumption-Time AVP would have the following ABNF grammar and define that the quota consumption must be stopped after a period equal to the Quota Consumption Time in which no packets are received or at session termination, whichever is sooner:

```
<Requested-Quota-Consumption-Time> ::=
    [ Min-Time ]
    [ Max-Time ]
```

Where the Requested-Quota-Holding-Time AVP would have the following ABNF grammar and define an idle timeout associated with a granted quota. If no traffic associated with the quota is observed for this time, the client understand that the traffic has stopped, and the quota is returned to the server. The client starts the quota holding timer when quota consumption ceases. This is when traffic ceases, i.e. the timer is re-started at the end of each packet:

```
<Requested-Quota-Holding-Time> ::=
    [ Min-Time ]
    [ Max-Time ]
```

Note:
Leaving out Min value would mean that there is no minimum value requested, and the same logic holds for the Max. In both cases, it would be up to the DIAMETER server to set the values.

Of further note, the network 10 comprises, for example, a Long Term Evolution (LTE) network, or an LTE-Advanced (LTE-A) network. But those examples are non-limiting, and the teachings herein have applicability to a range of networks that use quota reservations for online charging. Similarly, the user or UE 12 may comprise essentially any wireless communication apparatus, with notable examples including smart phones, tablets or other wireless-enabled computing devices, cellular modems or other wireless adaptors, etc.

Broadly, in at least one embodiment a charging client, e.g., implemented in the node 16, is configured to send a quota request to another node in the telecommunication network 10 that is operative as a charging server, e.g., implemented in the node 18. The quota request requests that the charging server grant a quota of a communication resource for usage by a user 12 of the telecommunication network. Advantageously, the node 16 includes a timer value in the quota request, requested by the charging client for timing a validity or consumption of the quota. The charging client receives a quota grant from the charging server, where the quota grant indicates a granted quota of the communication resource, for use by the user 12, and further indicates a granted timer value corresponding to the requested timer value. Responsive to determining that the quota grant is a conforming grant, based on determining at least that the granted timer value conforms to the requested timer value, the charging client allows use of the communication resource by the user 12 in accordance with the granted quota, and times the validity or consumption of the granted quota based on the granted timer value. The allowance of usage may involve the initiation of a new session or the continuation of an existing session.

In at least one embodiment, the timer value included by the charging server in the quota request comprises at least one of a quota validity timer value that defines for how long the granted quota remains valid at the charging client, a quota consumption timer value that defines a maximum chargeable pause in consumption of the granted quota by the user 12, and a quota consumption timer value that defines a maximum allowable pause in consumption of the granted quota by the user 12. Advantageously, the charging client in one or more embodiments determines the timer value(s) to include in the quota request, in dependence on current operating conditions at the charging client. In other words, the charging client requests one or more quota validity and/or quota consumption timer values that are tuned or otherwise tailored to operation conditions at the charging server. Doing so allows the charging server to operate with quota validity timer value, a quota holding timer value, and/or quota consumption timer value that is/are tuned to current operating conditions at the charging server, e.g., to reflect any one or more of its processing load, signaling load, memory utilization, etc.

The quota validity timer value controls how long the quota is held or deemed valid. The quota holding timer value defines a maximum allowable pause in consumption of the granted resource quota. The quota consumption timer value defines a maximum chargeable pause in consumption of the granted resource quota counted against consumption of the granted resource quota. By determining or "tuning" one or more such timer values in dependence on operating conditions at the charging client, and by indicating one or more such "tuned" timer values in the quota request sent to the charging server, the charging client can, subject to any granting restrictions imposed by the charging server, obtain quota grants having quota validity and/or consumption control times that are tuned to changing conditions at the charging client.

As for implementation details regarding the nodes 16 and 18, it shall be understood that such nodes may comprise complex, computer-based processing systems. More generally, the processing circuitry 36/56 of the node 16/18 comprises fixed circuitry, programmed circuitry, or a mix of fixed and programmed circuitry. In at least one embodiment, the processing circuitry 36/56 comprises digital processing circuitry including one or more microprocessors, digital signal processors or DSPs, application specific integrated circuits or ASICs, field programmable gate arrays or FPGAs, etc., along with supporting memory or other storage.

Correspondingly, the storage 38/58 comprising one or more types of non-transitory computer-readable media, such as any one or more of electromagnetic disk storage, solid state disk storage, volatile memory circuits such as DRAM or SRAM, and non-volatile memory circuits, such as FLASH or EEPROM. "Non-transitory" does not necessarily mean permanent or unchanging, but does connote that the storage 38/58 provides storage of at least some persistence for information contained therein. In at least one embodiment, the storage 38/58 stores a computer program 40/60 comprising program instructions by which the processing circuitry 36/56 is specially adapted to carry out the client/server operations described herein.

Notably, modifications and other embodiments of the disclosed invention(s) will come to mind to one skilled in the art having the benefit of the teachings presented in the preceding descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method performed by a node in a telecommunication network, the node operative as a charging client and the method comprising:
   receiving a request for resource usage, requesting usage of a communication resource of the telecommunication network by a user of the telecommunication network;
   determining a timer value, the timer value being a time for which a reservation against usage of the communication resource should remain valid against a subscriber account associated with the user;
   sending a reservation request to another node in the telecommunication network that is operative as a charging server, the reservation request indicating the timer value as a requested timer value;
   receiving a reservation response in return from the charging server, the reservation response indicating a quota reservation and a granted timer value for the quota reservation; and
   responsive to determining at least that the granted timer value conforms to the requested timer value:
      initiating or continuing a communication session for the user, based on a granted resource quota represented by the quota reservation;
      tracking consumption of the granted resource quota during the session; and
      timing expiration of the quota reservation according to the granted timer value.

2. The method of claim 1, further comprising including at least one of a requested quota holding timing and a requested quota consumption time in the reservation request, to be used by the charging client with request to the granted resource quota.

3. The method of claim 1, wherein determining the timer value comprises determining the timer value in dependence on loading at the charging client.

4. The method of claim 3, wherein the loading is measured in terms of ongoing signaling activity at the charging client, and wherein determining the timer value in dependence on the loading at the charging client comprises choosing a longer timer value than would otherwise be chosen, in response to determining that the level of signaling activity at the charging client meets or exceeds a defined signaling activity threshold.

5. The method of claim 3, wherein the loading is measured in terms of memory utilization at the charging client, and wherein determining the timer value in dependence on the loading of the charging client comprises choosing a shorter timer value than would otherwise be chosen, in response to determining that memory utilization at the charging client exceeds a defined utilization threshold, said memory utilization reflecting the utilization of memory at the charging client for managing quota reservations for multiple users being supported by the charging client.

6. The method of claim 1, wherein the charging client operates as a DIAMETER-based charging client in the telecommunications network.

7. The method of claim 1, wherein sending the reservation request includes indicating the timer value as a ranged value, and wherein determining that the granted timer value conforms with the timer value comprises determining that the granted timer value falls within the ranged value.

8. The method of claim 1, wherein determining that the granted timer value conforms with the requested timer value comprises determining that the granted timer value is within a defined range that includes the requested timer value.

9. The method of claim 1, further comprising, in response to determining that the granted timer value indicated in the reservation response does not conform to the requested timer value, performing non-conforming response handling, including deciding whether or not to use the granted resource quota for initiating or continuing the communication session for the user in dependence on at least one of:
   whether or not the loading at the charging client is above a defined threshold;
   whether or not the granted timer value deviates from the requested timer value by more than a defined amount; and
   whether or not one or more granted timer values previously received from the charging server and still valid were non-conforming with respect to the correspondingly requested timer values.

10. The method of claim 1, further comprising one of: determining a resource quota representing an amount or quantity of the communication resource to request for reservation to the user; or deferring determination of the resource quota to the charging server by indicating an empty or null quota request in the reservation request.

11. A node configured for operation as a charging client in a telecommunication network, the node comprising:
    communication interface circuitry configured to send and receive signaling to one or more other nodes or devices operating in the telecommunication network; and
    processing circuitry operatively associated with the communication interface circuitry and configured to:
       receive a request for resource usage, requesting usage of a communication resource of the telecommunication network by a user of the telecommunication network;
       determine a timer value, the timer value being a time for which a reservation against usage of the communication resource should remain valid against a subscriber account associated with the user;
       send a reservation request to another node in the telecommunication network that is operative as a charging server, the reservation request indicating the timer value as a requested timer value;
       receive a reservation response in return from the charging server, the reservation response indicating a quota reservation and a granted timer value; and
       responsive to determining at least that the granted timer value indicated in the reservation response conforms to the requested timer value:
          initiate or continue a communication session for the user, based on a granted resource quota represented by the quota reservation;
          track consumption of the communication resource during the session, against the quota reservation; and
          time expiration of the quota reservation according to the granted timer value.

12. The node of claim 11, wherein the processing circuitry is configured to include at least one of a requested quota holding timing and a requested quota consumption time in the reservation request, to be used by the charging client with request to the granted resource quota.

13. The node of claim 11, wherein the processing circuitry is configured to determine the timer value in dependence on loading at the charging client.

14. The node of claim 13, wherein the loading is measured in terms of ongoing signaling activity at the charging client, and wherein the processing circuitry is configured to choose a longer timer value than would otherwise be chosen, in response to determining that the level of signaling activity at the charging client meets or exceeds a defined signaling activity threshold.

15. The node of claim 13, wherein the loading is measured in terms of memory utilization at the charging client, and wherein the processing circuitry is configured to choose a shorter timer value than would otherwise be chosen, in response to determining that memory utilization at the charging client exceeds a defined utilization threshold, said memory utilization reflecting the utilization of memory at the charging client for managing quota reservations for multiple users being supported by the charging client.

16. The node of claim 11, wherein the charging client is configured for operation as a DIAMETER-based charging client in the telecommunications network.

17. The node of claim 11, wherein, for sending the reservation request, the processing circuitry is configured to indicate the requested timer value as a ranged value, and wherein the processing circuitry is configured to determine that the granted timer value conforms with the requested timer value by determining that the granted timer value falls within the ranged value.

18. The node of claim 11, wherein the processing circuitry is configured to determine that the granted timer value conforms with the requested timer value by determining that the granted timer value is within a defined range that includes the requested timer value.

19. The node of claim 11, wherein, in response to determining that the granted timer value indicated in the reservation response does not conform to the requested timer value, the processing circuitry is configured to performing non-conforming response handling, including deciding whether or not to use the granted quota for initiating or continuing the communication session for the user in dependence on at least one of:
whether or not the loading at the charging client is above a defined threshold;
whether or not the granted timer value deviates from the requested timer value by more than a defined amount; and
whether or not one or more granted timer values that were previously received from the charging server and still valid were non-conforming with respect to the correspondingly requested timer values.

20. The node of claim 11, wherein the processing circuitry is further configured to perform at least one of: determine a resource quota representing an amount or quantity of the communication resource to request for reservation to the user; or defer determination of the resource quota to the charging server by indicating an empty or null quota request in the reservation request.

21. The node of claim 11, wherein the processing circuitry is further configured to determine a quota holding time defining a maximum allowable pause in consumption of the granted resource quota, and send the quota consumption time in the reservation request, as a requested quota consumption time to be used by the charging client when tracking the consumption of the granted resource quota.

22. The node of claim 11, wherein the processing circuitry is further configured to determine a quota consumption time that defines a maximum chargeable pause in consumption of the granted resource quota counted against consumption of the granted resource quota, and send the quota consumption time in the reservation request, as a requested quota consumption time to be used by the charging client when tracking the consumption of the granted resource quota.

23. A method performed by a node in a telecommunication network, the node operative as a charging server and the method comprising:
receiving a reservation request from another node in the telecommunication network that is operative as a charging client, the reservation request indicating a requested timer value and requesting usage of a communication resource by a user of the telecommunication network, the requested timer value being a time for which a reservation against usage of the communication resource should remain valid against a subscriber account associated with the user;
determining whether or not a conforming reservation is possible, based on determining whether the requested timer value is acceptable to the charging server and whether the subscriber account has available funds sufficient to cover a resource quota to be reserved against the subscriber account as a granted resource quota; and
in response to determining that a conforming reservation is possible, sending a reservation response to the charging client indicating the granted resource quota as a resource reservation and indicating a granted timer value in conformance with the requested timer value.

24. The method of claim 23, wherein the reservation response indicates the granted timer value as an included time value that matches the requested timer value or at least falls within a defined range of the requested timer value.

25. The method of claim 23, further comprising, in response to determining that a conforming reservation is not possible, based on the requested timer value being unacceptable to the charging server, sending a non-conforming reservation response that includes a granted timer value that is acceptable to the charging server.

26. The method of claim 23, wherein the charging server determines whether or not the requested timer value is acceptable, based on reservation rules governing fund reservations made by the charging server against the subscriber account.

27. A node configured for operation as a charging server in a telecommunication network and comprising:
communication interface circuitry configured to communicatively couple the node to another node that is operative as a charging client in the telecommunication network; and
processing circuitry operatively associated with the communication interface circuitry and configured to:
receive a reservation request from the charging client, the reservation request indicating a requested timer value and requesting usage of a communication resource by a user of the telecommunication network, the requested timer value being a time for which a reservation against usage of the communication resource should remain valid against a subscriber account associated with the user;
determine whether or not a conforming reservation is possible, based on determining whether the requested timer value is acceptable to the charging server and whether the subscriber account has available funds sufficient to cover a resource quota to be reserved against the subscriber account as a granted resource quota; and in response to determining that a conforming reservation is possible, send a reservation response to the charging client indicating the granted resource quota as a resource reservation and indicating a granted timer value in conformance with the requested timer value.

28. The node of claim 27, wherein the reservation response indicates the granted timer value as an included time value that matches the requested timer value or at least falls within a defined range of the requested timer value.

29. The node of claim 27, wherein, in response to determining that a conforming reservation is not possible, based on the requested timer value being unacceptable to the charging server, the processing circuitry is configured to send a non-conforming reservation response that includes a granted timer value that is acceptable to the charging server.

30. The node of claim 27, wherein the processing circuitry is configured to determine whether or not the requested timer value is acceptable, based on reservation rules governing fund reservations made by the charging server against the subscriber account.

* * * * *